(No Model.) 4 Sheets—Sheet 1.
F. SIEMENS.
GLASS MELTING FURNACE.

No. 256,748. Patented Apr. 18, 1882.

(No Model.) 4 Sheets—Sheet 2.

F. SIEMENS.
GLASS MELTING FURNACE.

No. 256,748. Patented Apr. 18, 1882.

WITNESSES

INVENTOR
Frederick Siemens

ATTORNEY (No Model.)

4 Sheets—Sheet 3

F. SIEMENS.
GLASS MELTING FURNACE.

No. 256,748.　　　　　　　　Patented Apr. 18, 1882.

WITNESSES

INVENTOR
Frederick Siemens
by C. S. Whitman
ATTORNEY (No Model.) 4 Sheets—Sheet 4.

F. SIEMENS.
GLASS MELTING FURNACE.

No. 256,748. Patented Apr. 18, 1882.

WITNESSES

INVENTOR
Frederick Siemens
by C. S. Whitman
ATTORNEY

UNITED STATES PATENT OFFICE.

FREDERICK SIEMENS, OF DRESDEN, GERMANY, ASSIGNOR TO CHARLES WILLIAM SIEMENS, OF WESTMINSTER, ENGLAND.

GLASS-MELTING FURNACE.

SPECIFICATION forming part of Letters Patent No. 256,748, dated April 18, 1882.

Application filed July 12, 1881. (No model.) Patented in England November 22, 1879.

*To all whom it may concern:*

Be it known that I, FREDERICK SIEMENS, of Dresden, in the German Empire, have invented certain Improvements in the Construction of Glass-Melting Furnaces of that class for which Charles William Siemens, of Westminster, in the county of Middlesex, England, obtained Letters Patent for Great Britain, No. 4,763, bearing date the 22d of November, 1879, as a communication from abroad, of which the following is a specification.

My invention relates to that class of glass-melting furnaces for which Letters Patent of the United States numbered 127,806 were granted to Charles William Siemens and Frederick Siemens, June 11, 1872, and to Charles William Siemens, August 3, 1880, No. 230,667; and the nature thereof consists in dividing the tank of the furnace into several separate compartments by partitions which are kept cool by currents of air.

Figure 1:
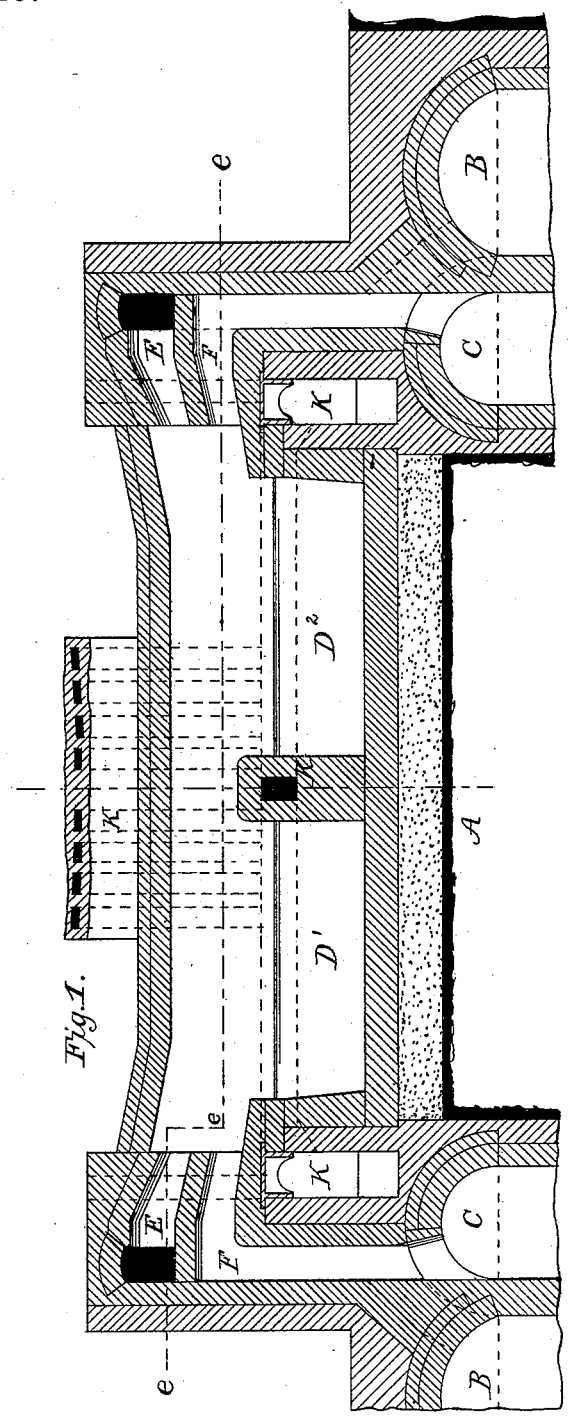
Figure 2:
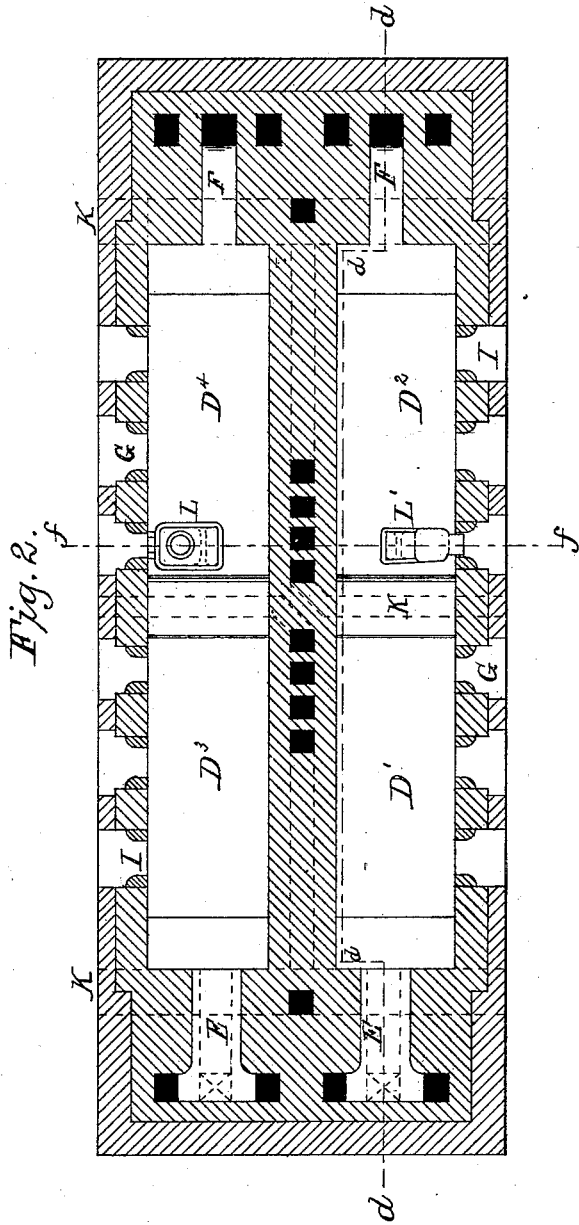
Figure 3:
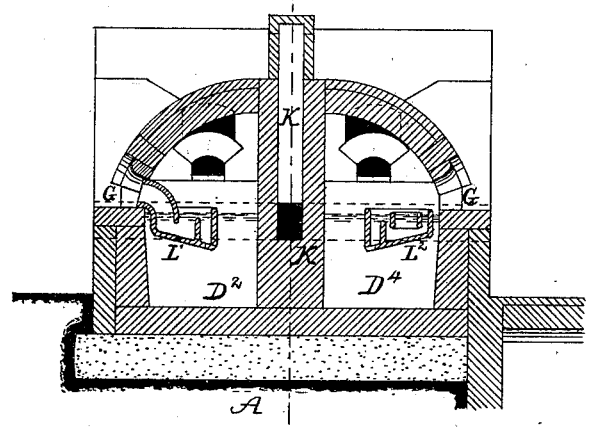
Figure 6:
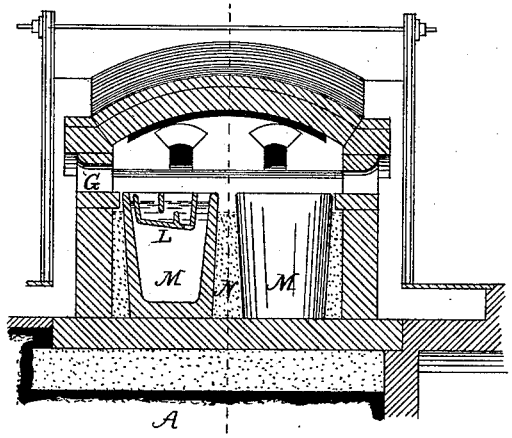
Figure 4:
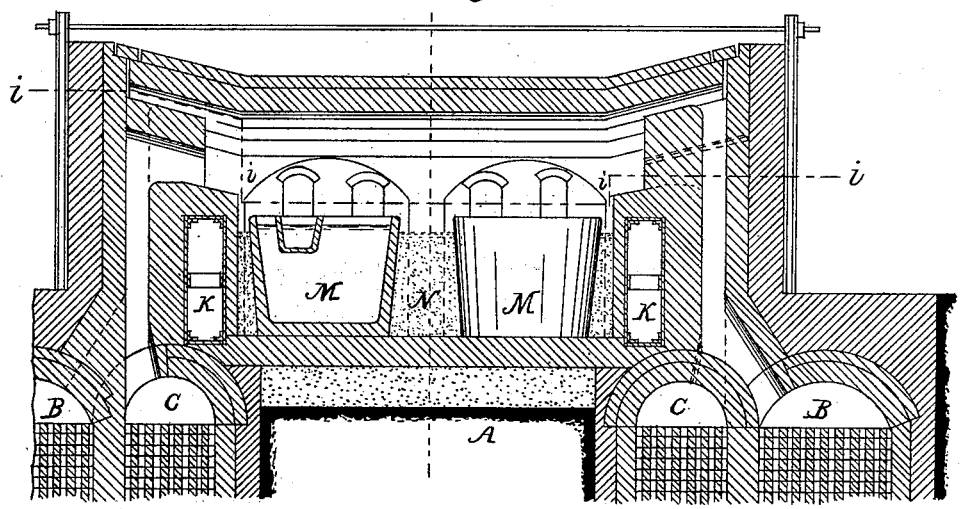
Figure 5:
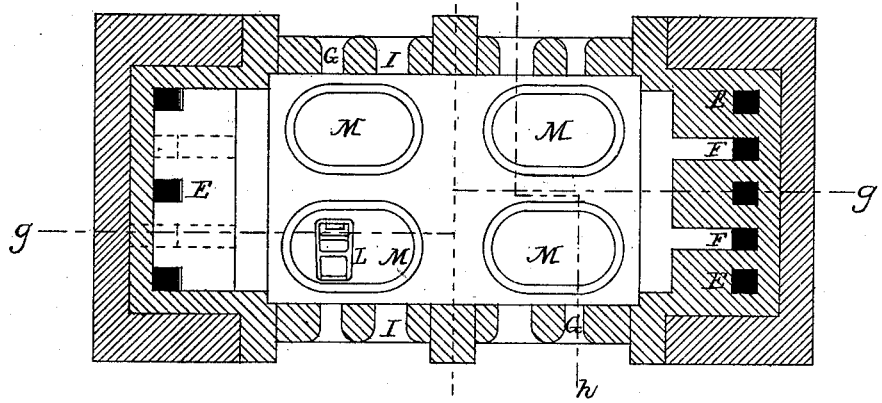

In the accompanying drawings, Figure 1 is a longitudinal section of a deep glass tank-furnace divided into separate compartments, taken on the line $d\,d$ of Fig. 2. Fig. 2 is a plan thereof on the line $e\,e$ of Fig. 1. Fig. 3 is a transverse section thereof on the line $f\,f$ of Fig. 2. Fig. 4 is a longitudinal section of a pot-furnace taken on the line $g\,g$ of Fig. 5. Fig. 5 is a plan of the same on the line $i\,i$ of Fig. 4. Fig. 6 is a transverse section of the same on the line $h\,h$ of Fig. 5.

A represents the ground, with regenerative chambers B B for air and C C for gas, arranged at the end and below the tank, as shown in Figs. 1, 3, 4, and 6, or on each side and below the tank, as shown in Fig. 1.

E and F are flues conveying the heated air and gas up from the regenerative chambers on the one side or end, while the products of combustion pass down by corresponding flues to the regenerative chambers on the other side or end, this movement being from time to time alternated in the known manner according to which regenerative gas-furnaces are operated. The furnace illustrated in Figs. 1, 2, and 3 is divided into four compartments, forming four tanks separated by partitions, which, as well as the end bridges, are kept cool by currents of air through flues K.

G indicates working-out holes at each side, each of which may have a boat or floating vessel, as shown at $L'$ or $L^2$, or two or more of such boats of smaller size, the construction and operation of which are fully described in an application for Letters Patent of the United States filed by me in the United States Patent Office on the 6th day of April, 1881. The furnace may obviously be divided into a greater or less number of separate compartments, according to the varieties of glass to be produced.

The furnace illustrated in Figs. 4, 5, and 6 contains pots M, which are to be worked continuously, as are the tanks represented in Figs. 1, 2, and 3—that is to say, with the hottest flame continuously on the surface of the material contained in them.

The number of pots may be obviously varied according to the dimensions and purpose of the furnace, and they can be loosely built round and supported by refractory material up to or nearly to their upper edges, in which case they may be of oval form, or of forms other than circular, the support given by the material in which they are bedded rendering great strength of the pots themselves unnecessary, and the bedding material protecting them from extreme heat or change of temperature.

The parts of the furnace corresponding with parts of those previously described with reference to Figs. 1, 2, and 3 are marked by similar letters of reference.

The tanks $D'$, $D^2$, $D^3$, and $D^4$ (illustrated in Figs. 1, 2, and 3) are made over eighteen inches in depth, because it has been found advantageous to reduce the surface metal subjected to the action of the flames and increase the depth of the tank, for reasons fully set forth in an application for Letters Patent of the United States filed in the United States Patent Office by me on the 24th day of May, A. D. 1881.

In some cases it has been found desirable that the tank should rest upon the ground. This has been effected by placing the regenerative chambers at each end of and below the tank, as shown in Figs. 1 and 4, or on each side of and below the tank.

In the Letters Patent granted to Charles William Siemens and Frederick Siemens, June 11, 1872, above mentioned, and in other Letters Patent, a tank has been described having partitions which are kept cool by currents of air.

I therefore claim—

In a regenerative furnace, the combination of a tank for the continuous melting of glass, divided into separate compartments by partitions, which are kept cool by air-flues, with gas and air ports arranged on each side of the tank, as and for the purposes described.

FREDERICK SIEMENS.

Witnesses:
    LÉON KLEMPERER,
    PAUL DUCKMULLER,
      *Both of Dresden.*